US012583746B2

(12) United States Patent
Ruggeri et al.

(10) Patent No.: US 12,583,746 B2
(45) Date of Patent: Mar. 24, 2026

(54) HYDROGEN PRODUCTION PROCESS AND PLANT

(71) Applicant: WOOD ITALIANA S.R.L., Corsico (IT)

(72) Inventors: Fabio Ruggeri, Corsico (IT); Valentina DePetri, Corsico (IT); Daniele Brambilla, Corsico (IT); Ashkan Ebrahimi, Corsico (IT)

(73) Assignee: WOOD ITALIANA S.R.L., Corsico (IT)

( * ) Notice: Subject to any disclaimer, the term of this patent is extended or adjusted under 35 U.S.C. 154(b) by 331 days.

(21) Appl. No.: 18/316,017

(22) Filed: May 11, 2023

(65) Prior Publication Data

US 2023/0365405 A1 Nov. 16, 2023

(30) Foreign Application Priority Data

May 13, 2022 (IT) ........................ 102022000009989

(51) Int. Cl.
| | |
|---|---|
| *C01B 3/48* | (2006.01) |
| *C01B 3/508* | (2026.01) |
| *C01B 3/52* | (2006.01) |

(52) U.S. Cl.
CPC ................ *C01B 3/48* (2013.01); *C01B 3/508* (2013.01); *C01B 3/52* (2013.01); (Continued)

(58) Field of Classification Search
CPC .. C01B 3/50; C01B 3/508; C01B 3/48; C01B 3/38; C01B 3/52; C01B 2203/047; (Continued)

(56) References Cited

U.S. PATENT DOCUMENTS

| | | | |
|---|---|---|---|
| 9,028,794 | B2 | 5/2015 | Darde et al. |
| 2010/0260657 | A1 | 10/2010 | Niitsuma et al. |

(Continued)

FOREIGN PATENT DOCUMENTS

WO 20200245792 12/2020

OTHER PUBLICATIONS

Italian Search Report and Written Opinion issued in connection with Italian Application No. IT202200009989 and dated Jan. 13, 2023 (8 pages).

(Continued)

*Primary Examiner* — Prem C Singh
*Assistant Examiner* — Brandi M Doyle
(74) *Attorney, Agent, or Firm* — KLINTWORTH & ROZENBLAT LLP

(57) ABSTRACT

A process for the production of hydrogen comprises: a first steam reforming step of a feedstock containing hydrocarbons to obtain a first synthesis gas; a first synthesis gas shift and cooling step on the first synthesis gas; a separation step for separating the first synthesis gas into a high concentration hydrogen stream and a tail gas stream; a second low pressure steam reforming step performed on the tail gas to obtain a second synthesis gas; a second synthesis gas shift and cooling step on the second synthesis gas; a CO2 removal step performed on the stream of hydrogen and carbon dioxide exiting the second synthesis gas shift and cooling step in order to separate a CO2 stream from a fuel grade hydrogen stream; a step of feeding at least a part of the fuel grade hydrogen stream to the first steam reforming step.

8 Claims, 2 Drawing Sheets

(52) U.S. Cl.
CPC ................. *C01B 2203/0233* (2013.01); *C01B 2203/0288* (2013.01); *C01B 2203/0415* (2013.01); *C01B 2203/0425* (2013.01); *C01B 2203/043* (2013.01); *C01B 2203/047* (2013.01); *C01B 2203/0827* (2013.01); *C01B 2203/146* (2013.01); *C01B 2203/1628* (2013.01)

(58) Field of Classification Search
CPC .... C01B 2203/0233; C01B 2203/0827; C01B 2203/0415; C01B 2203/043; C01B 2203/0283; C01B 2203/146; C01B 2203/0425; C01B 2203/08822; C01B 2203/0475; C01B 2203/147; C01B 2203/142; C01B 2203/0288; C01B 2203/1628; C01B 2203/1258
See application file for complete search history.

(56) References Cited

U.S. PATENT DOCUMENTS

| | | |
|---|---|---|
| 2011/0104045 A1 | 5/2011 | Grover |
| 2017/0327444 A1 | 11/2017 | Steynberg et al. |

OTHER PUBLICATIONS

Communication pursuant to Rule 114(2) EPC issued in connection with European Patent Application No. 23173048.2, dated Feb. 22, 2024, 7 pages.

HYDROGEN PRODUCTION PROCESS AND PLANT

CROSS-REFERENCE TO RELATED APPLICATIONS

This application claims priority from Italian patent application no. 102022000009989 filed on May 13, 2022, the entire disclosure of which is incorporated herein by reference.

TECHNICAL FIELD

The present invention relates to a process and to a plant for the production of hydrogen.

In particular, the invention relates to a process and plant for the production of hydrogen by means of low pressure steam reforming, with the aim of producing fuel grade hydrogen to be burned in order to provide the duty required by the endothermic reactions of a further steam reforming process, as well as of appreciably increasing the decarbonization obtainable by said steam reforming process, in particular by enabling an increase in the conversion of methane and carbon monoxide contained in the tail gases of the process into hydrogen.

BACKGROUND

Production of hydrogen by means of steam reforming reactions between water vapour and hydrocarbons is known.

The reforming reaction is highly endothermic, is consequently thermodynamically favoured by the high temperature and is performed using a, typically nickel-based, catalyst specially formulated in tubes placed in the radiant zone of a reforming reactor. After cooling to a suitable temperature, the carbon monoxide formed during the reforming reactions is further reduced with unreacted steam in a shift converter in order to produce carbon dioxide and additional hydrogen.

The stream of raw hydrogen is then cooled and purified, for example by means of a pressure swing adsorption (PSA) unit.

The chemical reactions involved are as follows:

$$CH_4+H_2O \leftrightarrow CO+3H_2 \tag{1}$$

$$CO+H_2O \leftrightarrow CO_2+H_2 \tag{2}$$

In order to handle more feedstocks, a pre-reformer can optionally be installed upstream of the reforming reactor. Especially with heavy feedstocks, the use of the pre-reformer makes it possible to reduce the heater duty of the reforming reactor and to render the process more thermally efficient.

In the pre-reforming process, methane is steam-reformed and heavier hydrocarbons are converted to methane or steam-reformed directly, whereby an effluent containing only H2, CO, CO2, CH4 and H2O is obtained. The relevant chemical reactions are as follows:

$$CH_4+H_2O \leftrightarrow CO+3H_2 \tag{1}$$

$$CO+H_2O \leftrightarrow CO_2+H_2 \tag{2}$$

$$C_nH_n+nH_2O \leftrightarrow nCO+(n+m/2)H_2 \tag{3}$$

$$C_nH_n+(2n-m/2)H_2 \leftrightarrow nCH_4 \tag{4}$$

The reactions (2) and (4) are exothermic, while the reaction (3) is endothermic and the reaction (1) is highly endothermic as mentioned above. There can thus be an increase or decrease in net temperature as a function of the feedstock. Light charges produce an endothermic effect while heavy charges produce an exothermic effect.

A conventional plant for the production of hydrogen by means of steam reforming is illustrated schematically in FIG. 1.

Feedstocks containing hydrocarbons (for example, natural gas, naphtha, LPG, etc.) are fed to a steam reforming reactor together with steam and a fuel gas that is burned in order to provide the necessary heat for the endothermic reforming reactions.

In order to handle more feedstocks, a pre-reformer is optionally installed upstream of the reforming reactor. Especially with heavy feedstocks, the use of the pre-reformer makes it possible to reduce the heater duty of the reforming reactor and to render the process more thermally efficient.

The synthesis gas obtained by steam reforming is sent to a shift converter where, after cooling to a suitable temperature, the carbon monoxide formed during the reforming reactions is further reduced with unreacted steam in order to produce carbon dioxide and additional hydrogen. The stream of raw hydrogen is then cooled and purified by means of a separation unit, typically a pressure swing adsorption (PSA) unit.

A stream of hydrogen produced by the PSA unit is added as recirculating hydrogen to the feed of the steam reforming reactor. The quantity of hydrogen is required for the hydrogenation of the organic sulphur compounds contained in the charge to H2S, for the saturation of any olefins present, and to prevent the formation of coke on downstream equipment with a heavy charge; alternatively, this stream can be imported from the battery limits, where available.

Plants and processes for the production of hydrogen from fossil fuels are also subject to the need to reduce carbon emissions, through CO2 capture.

In this respect, the modernization of existing plants, with a view to their conversion into low-carbon plants (for the production of the so-called "blue hydrogen"), is particularly important.

Although efficient technologies are indeed available from the point of view of carbon recovery, they are often not suitable for revamping existing plants, as they require considerable and costly plant modifications.

In general, two types of solutions are available for obtaining a high carbon recovery from plants for the production of hydrogen:

(a) pre-combustion capture, wherein CO2 is removed from the stream of syngas exiting the shift section after separation of the condensate by means of amines, hot potassium carbonate, physical solvents, or membranes;

b) post-combustion capture, with removal of the carbon from the flue gases; in this case, the solvents commonly considered for CO2 capture are only of chemical type.

The recovery of CO2 by means of a pre-combustion capture is limited to values around 60% if fuel gas is burned inside the steam reforming furnace; a 90% recovery of CO2 can only be achieved by means of post-combustion capture, but with high energy consumption and significantly higher investment and removal costs.

SUMMARY

It is consequently an object of the present invention to provide a process and a plant for the production of hydrogen that overcome the drawbacks of the prior art pointed out here.

In particular, it is an object of the invention to provide a process and a plant for the production of hydrogen that are particularly efficient, especially in terms of CO2 emissions.

It is a particular object of the invention to provide a process and a plant for the production of hydrogen that are also suitable for revamping existing plants, without requiring excessive and costly plant modifications.

The present invention thus relates to a process and a plant for the production of hydrogen as defined in the appended claims 1 and 6, respectively.

Preferred auxiliary features of the invention are defined in the dependent claims.

The invention provides a process and a plant which, by means of a low pressure steam reforming setup, allows fuel grade hydrogen to be produced from a residual stream; the fuel grade hydrogen is then used (burned) to provide the thermal duty required by the endothermic reactions of a further steam reforming process.

The setup of the invention is very well suited to revamping opportunities. The production of fuel grade hydrogen to be produced and burned inside a steam reforming reactor allows decarbonization levels of more than 95% to be achieved even with pre-combustion carbon capture.

The invention consequently accomplishes the following main advantages:

high CO2 recovery (over 95%);
  high methane conversion;
  lower demand for steam;
  lower production costs and times of the plants, even in cases of revamping;
  simplicity of upgrading existing plants.

BRIEF DESCRIPTION OF THE DRAWINGS

Further characteristics and advantages of the present invention will become apparent from the following description of a non-limiting example embodiment thereof with reference to the accompanying figures, wherein.

DESCRIPTION OF EMBODIMENTS

Figure 2:
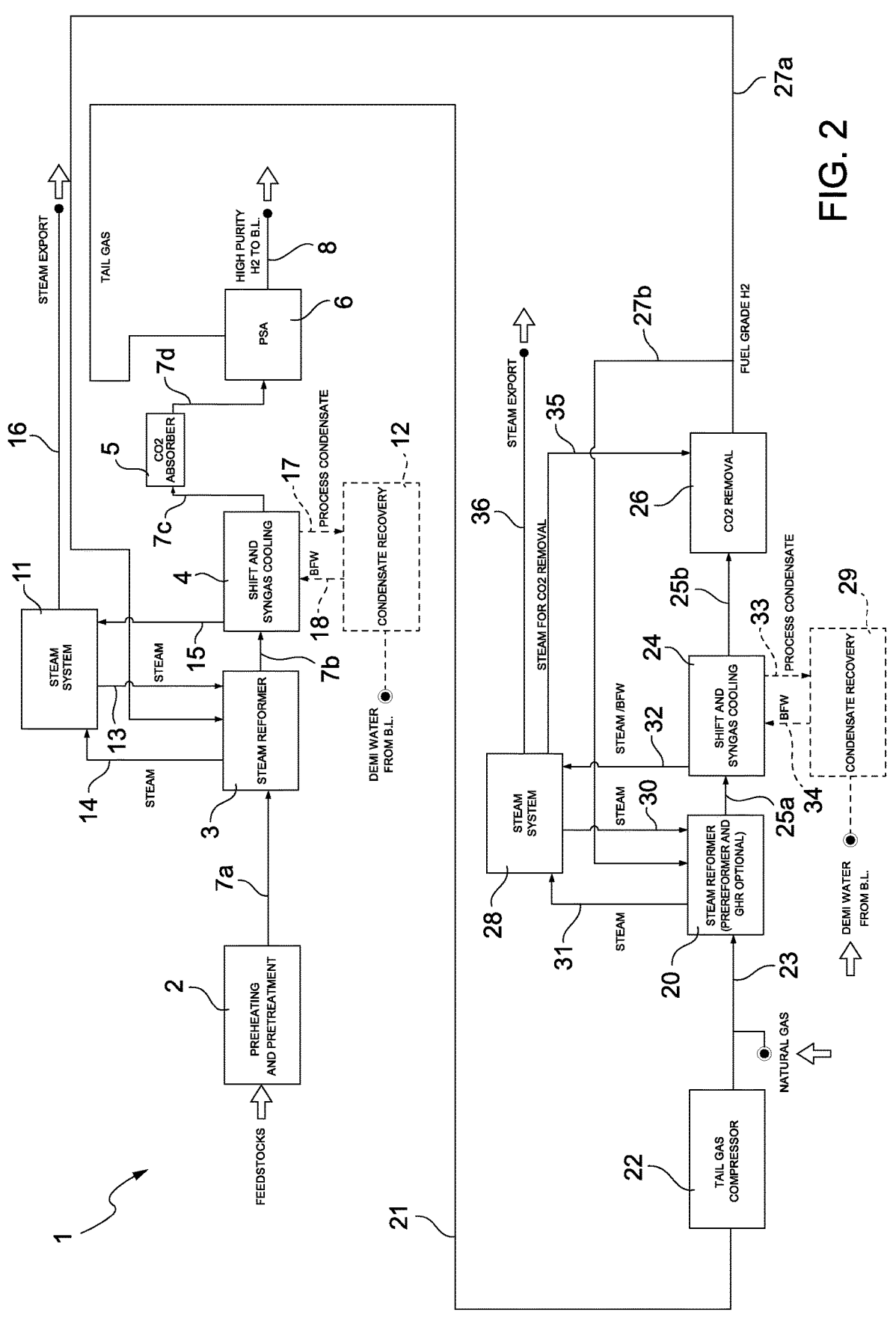
FIG. 2 is a block diagram of a plant for the production of hydrogen according to the invention, which in operation implements the process of the invention.

In FIG. 2, reference number 1 indicates a plant for the production of hydrogen that implements the process of the invention.

Figure 1:
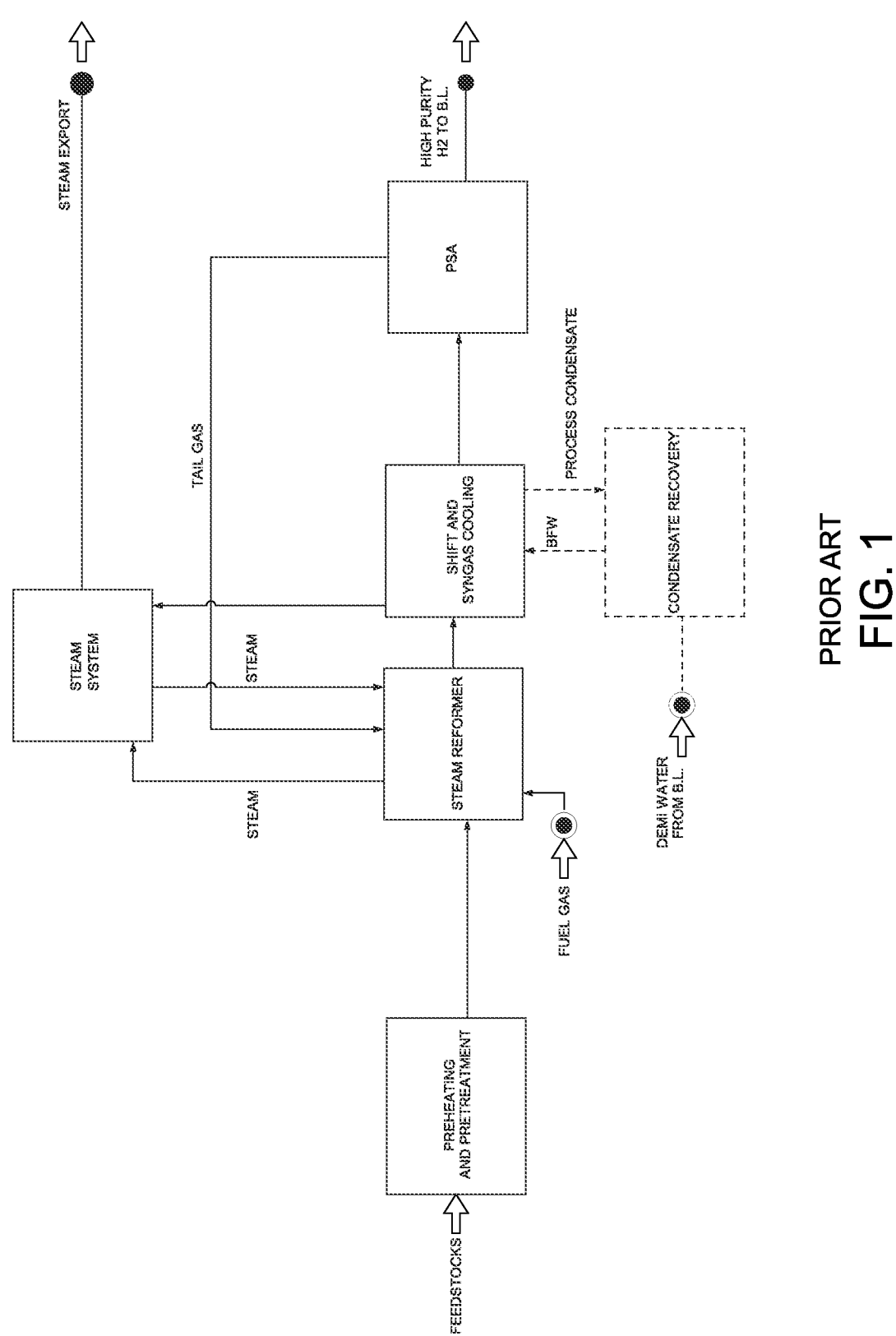
FIG. 1 is a block diagram of a plant for the production of hydrogen operating according to the known art.

Analogously to conventional plant setups of the type illustrated in FIG. 1, the plant 1 comprises a preheating and pretreatment section 2, which receives feedstock containing hydrocarbons; a steam reforming section 3 where a steam reforming reaction of the hydrocarbons fed with the feedstock occurs to form a synthesis gas (syngas); a synthesis gas shift and cooling section 4, where carbon monoxide and water present in the synthesis gas react to produce hydrogen and carbon dioxide; optionally, a $CO_2$ absorption section 5, where carbon dioxide is removed from the synthesis gas; a separation section 6, for example a pressure swing adsorption (PSA) section, to obtain a gaseous stream of high concentration hydrogen.

The pretreatment and preheating section 2, the steam reforming section 3, the synthesis gas shift and cooling section 4, the CO2 absorption section 5 and the separation section 6 are connected in series by respective lines 7a-7d. The separation section 6 has an H2 outlet line 8 that supplies high concentration hydrogen.

The plant 1 further comprises a steam section 11 and, optionally, a condensate recovery section 12.

The steam section 11 is connected to the steam reforming section 3 by a water/steam supply line 13 in order to supply steam to the steam reforming section 3, and by a water/steam return line 14 that returns steam from the steam reforming section 3. The steam section 11 is also connected to the synthesis gas shift and cooling section 4 by a steam recovery line 15 in order to recover steam from the synthesis gas shift and cooling section 4. The steam section 11 further has a steam outlet line 16 that supplies steam for other purposes.

The condensate recovery section 12 (optional and consequently depicted by a dashed line) is connected to the synthesis gas shift and cooling section 4 by a condensate line 17, via which the condensate recovery section 12 receives process condensates from the synthesis gas shift and cooling section 4; and by a water supply line 18, via which feed water (BFW), partly stemming from an external source (i.e. from the battery limits, B.L.) as demineralized water and partly recovered from the process condensates in the condensate recovery section 12, is sent to the synthesis gas shift and cooling section 4. The presence of the condensate recovery section 12 is, however, entirely optional.

According to the invention, the plant 1 comprises a second steam reforming section 20, in particular a low pressure steam reforming section.

Compared to the steam reforming section 3, the low pressure steam reforming section 20 operates at a lower pressure. In particular, the low pressure steam reforming section 20 operates at such pressures that the hydrogen produced by the low pressure steam reforming section 20 has a pressure of approximately 1.5 to approximately 5 barg, while the pressure of the hydrogen produced by the steam reforming section 3 is approximately 15-40 barg.

Optionally, the low pressure steam reforming section can include a pre-reformer and/or a GHR (gas-heated reformer).

The low pressure steam reforming section 20 is connected via a gas line 21 to an outlet of the separation section 6, from which it receives a tail gas produced in the separation section 6, duly compressed by means of a compressor 22.

In addition to the tail gas from the separation section 6, the low pressure steam reforming section 20 is fed with a stream of natural gas via a gas feeding line 23, which also receives the tail gas from the gas line 21, duly compressed.

In the low pressure steam reforming section 20, a steam reforming reaction of the hydrocarbons present in the natural gas and in the tail gas from the separation section 6 occurs and synthesis gas (syngas) is formed.

The synthesis gas produced in the low pressure steam reforming section 20 is sent to a second synthesis gas shift and cooling section 24, connected to the low pressure steam reforming section 20 by a line 25a and where carbon monoxide and water present in the synthesis gas react to produce hydrogen and carbon dioxide; and then to a CO2 removal section 26, connected to the synthesis gas shift and cooling section 24 by a line 25b and where carbon dioxide is removed from the synthesis gas, whereby a stream of fuel grade hydrogen is obtained. Optionally, the fuel grade hydrogen obtained from the CO2 removal section 26 is fed to the steam reforming section 3 via an H2 recirculating line 27a that connects an outlet of the CO2 removal section 26 with a fuel inlet of the steam reforming section 3.

Here and in the following, as is common in the industry, fuel grade hydrogen is understood to be hydrogen with a titre greater than or equal to 90% (and less than 99.9%).

A part of the produced fuel grade hydrogen is recirculated to the low pressure steam reforming section 20 via an additional H2 recirculating line 27b, which departs from the recirculating line 27a and is connected to an inlet of the low pressure steam reforming section 20.

The plant 1 comprises an additional steam section 28 and, optionally, an additional condensate recovery section 29 (shown as a dashed line in FIG. 2).

The steam section 28 is connected to the low pressure steam reforming section 20 by a steam feeding line 30 in order to provide the steam necessary for the reforming reactions, and by a steam return line 31 for the recovery of steam from the low pressure steam reforming section 20.

The steam section 28 is also connected to the synthesis gas shift and cooling section 24 by a steam recovery line 32 in order to recover steam from the synthesis gas shift and cooling section 24.

The condensate recovery section 29 is connected to the synthesis gas shift and cooling section 24 by a condensate line 33, via which the condensate recovery section 29 receives process condensates from the synthesis gas shift and cooling section 24; and by a water supply line 34, via which feed water (BFW), partly fed from an external source as demineralized water and partly recovered from the process condensates in the condensate recovery section 29, is sent to the synthesis gas shift and cooling section 24. The presence of the condensate recovery section 29, like that of the condensate recovery section 12, is also entirely optional.

The low pressure steam reforming section 20, the synthesis gas shift and cooling section 24, and the CO2 removal section 26 are connected in series by the respective lines 25a, 25b.

The CO2 removal section 26 is connected to the steam section 28 by a steam line 35, which feeds steam to the CO2 removal section 26 in order to carry out the removal of CO2 from the synthesis gas. Alternatively, direct integrations of a stream of condensing syngas are possible for the removal of CO2.

Any excess steam not required by the low pressure steam reforming section 20 and by the CO2 removal section 26 can be supplied for other purposes by means of a steam outlet line 36.

The operation of the plant 1 implementing the process of the invention for the production of hydrogen is as follows.

A gaseous stream of hydrocarbon feedstock, optionally consisting of a plurality of different feedstocks (for example, natural gas, naphtha, LPG, etc.), after being optionally pretreated in the pretreatment and preheating section 2, is fed to the steam reforming section 3, where a steam reforming process occurs with the formation of a synthesis gas.

The synthesis gas exiting the steam reforming section 3 is sent to the synthesis gas shift and cooling section 4, where carbon monoxide and water present in the synthesis gas react to produce hydrogen and carbon dioxide; then to the CO2 absorption section 5 (potentially added to the plant 1 in cases of revamping of an existing plant), where carbon dioxide is removed from the synthesis gas; and finally to the separation section 6, in order to obtain a gaseous stream of high concentration hydrogen, which is taken away via the H2 outlet line 8.

The separation section 6 separates the stream of high concentration hydrogen from a stream of tail gas (containing CO2, residual methane, etc.) that is taken away in the gas line 21.

The tail gas taken from the separation section 6, instead of being recirculated to the steam reforming section 3 as in the conventional setup, is sent, if necessary after compression by means of the compressor 22, to the low pressure steam reforming section 20 to be converted in turn.

In particular, the tail gas is treated in the low pressure steam reforming section 20, where a steam reforming process takes place with formation of synthesis gas that is subjected to conversion in the synthesis gas shift and cooling section 24, where carbon monoxide and water present in the synthesis gas react to produce hydrogen and carbon dioxide; and then to CO2 removal in the CO2 removal section 26, where carbon dioxide is removed from the synthesis gas.

A stream of fuel grade hydrogen is obtained that is recirculated to the steam reforming section 3 in order to be burned and to provide heat for the reforming reactions. A fraction of the fuel grade hydrogen exiting the CO2 removal section 26 is recirculated to the inlet of the low pressure steam reforming section 20, again in order to be burned and to provide heat.

According to the invention, therefore, it is not necessary to feed fuel gas to the steam reforming section 3: while in the conventional setup illustrated in FIG. 1, it is necessary to burn fuel gas, integrated with tail gas recovered from a separation unit, in order to provide the heat required for the reforming reactions, the thermal duty required for the reforming reactions in the steam reforming section 3 is provided in accordance with the invention by the combustion of the fuel grade hydrogen produced by means of the second low pressure steam reforming section 20 and the synthesis gas shift and cooling section 24 and purified of CO2 in the CO2 removal section 26.

Finally, it is understood that the process and the plant described and illustrated herein can be subject to further modifications and variations that do not depart from the scope of the appended claims.

The invention claimed is:

1. A process for the production of hydrogen, comprising: a first steam reforming step of a feedstock containing hydrocarbons to obtain a first synthesis gas; a first synthesis gas shift and cooling step, where carbon monoxide and water present in the first synthesis gas react to give hydrogen and carbon dioxide; a separation step for separating the first synthesis gas in a high concentration hydrogen stream and a tail gas stream; the process being characterized in that the tail gas separated in the separation step is fed to a second low pressure steam reforming step, performed at a pressure lower than the first steam reforming step, to obtain a second synthesis gas; and by comprising then a second synthesis gas shift and cooling step, performed on the second synthesis gas for converting carbon monoxide and water present in the second synthesis gas into hydrogen and carbon dioxide; a CO2 removal step performed on the stream of hydrogen and carbon dioxide exiting from the second synthesis gas shift and cooling step to separate a CO2 stream from a fuel grade hydrogen stream having a titre greater than or equal to 90% and less than 99.9%; a step of feeding at least a first part of the fuel grade hydrogen stream to the first steam reforming step, and a second part of the fuel grade hydrogen stream to the second low pressure steam reforming step.

2. The process according to claim 1, wherein the tail gas separated in the separation step is entirely sent to the second low pressure steam reforming step.

3. The process according to claim 1, wherein the thermal duty required for the reforming reactions in the first steam reforming step is provided by the combustion of the fuel grade hydrogen produced in the second low pressure steam reforming step and in the second synthesis gas shift and cooling step and purified in the CO2 removal step, and without adding any other fuel gas.

4. The process according to claim 1, comprising a CO2 absorption step, performed on the first synthesis gas exiting from the first synthesis gas shift and cooling step to remove carbon dioxide from the first synthesis gas.

5. A plant (1) for the production of hydrogen, comprising: a first steam reforming section (3) for producing a first synthesis gas from a feedstock containing hydrocarbons; a first synthesis gas shift and cooling section (4) connected to the first steam reforming section (3) to treat the first synthesis gas therefrom; a separation section (6) connected to the first synthesis gas shift and cooling section (4) to separate the first synthesis gas in a high concentration hydrogen stream and a tail gas stream; the plant (1) being characterized by comprising a second low pressure steam reforming section (20), operating at a pressure lower than the first steam reforming section (3) and connected to an outlet of the separation section (6) via a gas line (21) to convey the tail gas produced in the separation section (6) to the second low pressure steam reforming section (20); a second synthesis gas shift and cooling section (24), connected to the second low pressure steam reforming section (20) to receive a second synthesis gas from the second low pressure steam reforming section (20); a CO2 removal section (26), connected to the second synthesis gas shift and cooling section (24) to remove carbon dioxide from the second synthesis gas obtaining a fuel grade hydrogen stream having a titre greater than or equal to 90% and less than 99.9%; and a first H2 recirculating line (27*a*) connecting the CO2 removal section (26) with a fuel inlet of the first steam reforming section (3); and a second H2 recirculating line (27*b*) departing from the first H2 recirculating line (27*a*) and connected to an inlet of the second low pressure steam reforming section (20).

6. The plant according to claim 5, wherein the separation section (6) has only one outlet for the tail gas and one outlet for the high concentration hydrogen stream, so that the tail gas is entirely sent to the second low pressure steam reforming section (20).

7. The plant according to claim 5, wherein the first steam reforming section (3) has only one fuel inlet connected to the first H2 recirculating line (27*a*) and no other inlets for other fuel gases to be burned in the first steam reforming section (3), so that the thermal duty required for the reforming reactions in the first steam reforming section (3) is provided by combustion of the fuel grade hydrogen only, coming through the first H2 recirculating line (27*a*).

8. The plant according to claim 5, comprising a CO2 absorption section (5), arranged between the first synthesis gas shift and cooling section (4) and the separation section (6) and connected to the first synthesis gas shift and cooling section (4) to remove carbon dioxide from the first synthesis gas.

* * * * *